United States Patent [19]
Fuhlbrigge

[11] Patent Number: 5,890,656
[45] Date of Patent: Apr. 6, 1999

[54] INTEGRATED GEAR PUMP DISPENSER FOR ROBOTIC DISPENSING

[75] Inventor: Thomas A. Fuhlbrigge, Auburn Hills, Mich.

[73] Assignee: ABB Flexible Automation Inc., New Berlin, Wis.

[21] Appl. No.: 768,754

[22] Filed: Dec. 16, 1996

[51] Int. Cl.⁶ .................................................. B25J 11/00
[52] U.S. Cl. .................. 239/227; 239/225.1; 901/18; 901/43; 901/22; 901/29
[58] Field of Search ................... 239/225.1, 227; 901/18, 43, 41, 22, 29

[56] References Cited

U.S. PATENT DOCUMENTS

| | | | |
|---|---|---|---|
| 3,390,638 | 7/1968 | Adams | 103/2 |
| 3,424,092 | 1/1969 | Hortvet et al. | 103/50 |
| 4,420,291 | 12/1983 | Winstead | 417/338 |
| 4,561,592 | 12/1985 | Fender et al. | 239/587 |
| 4,690,327 | 9/1987 | Takai et al. | 239/226 |
| 4,702,931 | 10/1987 | Falcoff | 427/10 |
| 4,726,528 | 2/1988 | Gaiotto et al. | 239/579 |
| 4,785,760 | 11/1988 | Tholome | 118/323 |
| 4,872,417 | 10/1989 | Kuwabara et al. | 118/411 |
| 4,944,459 | 7/1990 | Watanabe et al. | 239/305 |
| 4,984,745 | 1/1991 | Akeel et al. | 239/587 |

*Primary Examiner*—Andres Kashnikow
*Assistant Examiner*—David Deal
*Attorney, Agent, or Firm*—Harness, Dickey & Pierce, P.L.C.

[57] ABSTRACT

The present invention provides a robotic dispensing apparatus comprising a gear pump operably coupled to a rotatable element positioned along the sixth axis of a multi-axis robot such that the gear pump is driven by the multi-axis robot. In one embodiment of the present invention, a sixth axis motor of the multi-axis robot drives the rotatable element and a dispense valve communicates with the gear pump for receiving and dispensing viscous material from the gear pump. Preferably, a flexible coupling interconnects the gear pump and the rotatable element and a manifold and piping system cooperate to deliver the viscous material pumped by the gear pump to the dispense valve.

17 Claims, 3 Drawing Sheets

INTEGRATED GEAR PUMP DISPENSER FOR ROBOTIC DISPENSING

BACKGROUND OF THE INVENTION

1. Technical Field

The present invention relates generally to robotic dispensing systems and more particularly to a gear pump dispenser integrated with a robotic assembly for robotic dispensing of a viscous material.

2. Discussion

The use of robots to implement numerous manufacturing processes has increased dramatically in the last decade. Robots now perform various manufacturing operations such as dispensing, deburring, grinding, polishing, painting, finish coating, cutting, welding, and others. A well-adjusted robot enables enhanced control and repeatability of the manufacturing process.

In one robotically implemented manufacturing process, structural components are secured together using a viscous adhesive applied by an automated robotic system. Materials such as PVC based sealants and adhesives, heat cure epoxies, two-component epoxies and others are typical of viscous materials commonly applied through use of robotic systems. Commonly, a gear pump is utilized to pump the viscous material to a dispense valve from which it is emitted.

Robotic dispensing systems generally dispense a bead of the viscous material along a perimeter or other desired pathway of the structural member. Often, the adhesive bead is dispensed such that it maintains a desired shape over the entire pathway along the application area. To accomplish this, the robotic system is configured to rotate the dispensing valve as the dispensing proceeds so that the orientation of the valve with respect to the structural member is controlled. Therefore, the dispensing orifice of the valve, which is usually shaped to emit the material in its predetermined form, dispenses the shaped bead of material in a proper orientation.

In other applications, however, the desired shape of the adhesive bead is symmetrical, i.e., cylindrical or round. Therefore, the orientation of the dispensing valve with respect to the structural member is largely unconstrained. In other words, there is no requirement for the dispensing valve to be rotated as it tracks along the application surface.

Conventional robotic dispensing systems use one dispensing configuration for emitting either a symmetrical bead or a shaped bead. In this configuration, the dispense valve is mounted to the end of a positionable arm along an axis of rotation. The gear pump is often mounted on the shoulder of a robot and utilizes a separate motor, controller, and reduction gear to operate. A whip hose or other conduit interconnects the shoulder mounted gear pump and the dispense valve.

Until recently, this axis of rotation, commonly known in the art as the sixth axis, was limited to rotating only 360° in a first direction or 360° in a second direction. However, advancements in robotic systems have increased the rotation of the sixth axis. The sixth axis is now able to rotate in a first or second direction perpetually.

Therefore, it is an object of the present invention to provide a dispensing system utilizing the perpetual rotation of the sixth axis to drive a gear pump such that the complexity and cost of prior systems is reduced. Additionally, it is an object of the present invention to provide a dispensing system eliminating the need for a separate motor and controller for operating the gear pump. Furthermore, it is an object of the present invention to provide a dispensing system eliminating the need for a whip hose between the gear pump and dispense valve.

SUMMARY OF THE INVENTION

The above and other objects are provided by a robotic dispensing apparatus comprising a gear pump operably coupled to a rotatable element positioned along the sixth axis of a multi-axis robot such that the gear pump is driven by the multi-axis robot. In one embodiment of the present invention, a sixth axis motor of the multi-axis robot drives the rotatable element and a dispense valve communicates with the gear pump for receiving and dispensing viscous material from the gear pump. Preferably, a flexible coupling interconnects the gear pump and the rotatable element and a manifold and piping system cooperate to deliver the viscous material pumped by the gear pump to the dispense valve.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

The following description of the preferred embodiments is merely exemplary in nature and is in no way intended to limit the present invention or its application or uses.

The present invention is particularly concerned with providing a gear pump dispenser integrated with the sixth axis motor of an automated multi-axis robotic system. As is known, many manufacturing applications require a bead of adhesive material to be robotically dispensed onto a structural member. Often, the cross-sectional shape of the desired bead is circular. In these instances, the need for continuously re-orientating the adhesive dispense valve with respect to the structural member during dispensing of the adhesive is eliminated. As such, the axis of rotation normally dedicated to positioning the dispense valve is freed for alternative uses. The present invention utilizes this freedom along with recent advances in the state of the art allowing for continual rotation of the robot sixth axis to integrate a gear pump with the robotic system such that the sixth axis motor rotatably drives the gear pump.

Figure 1:
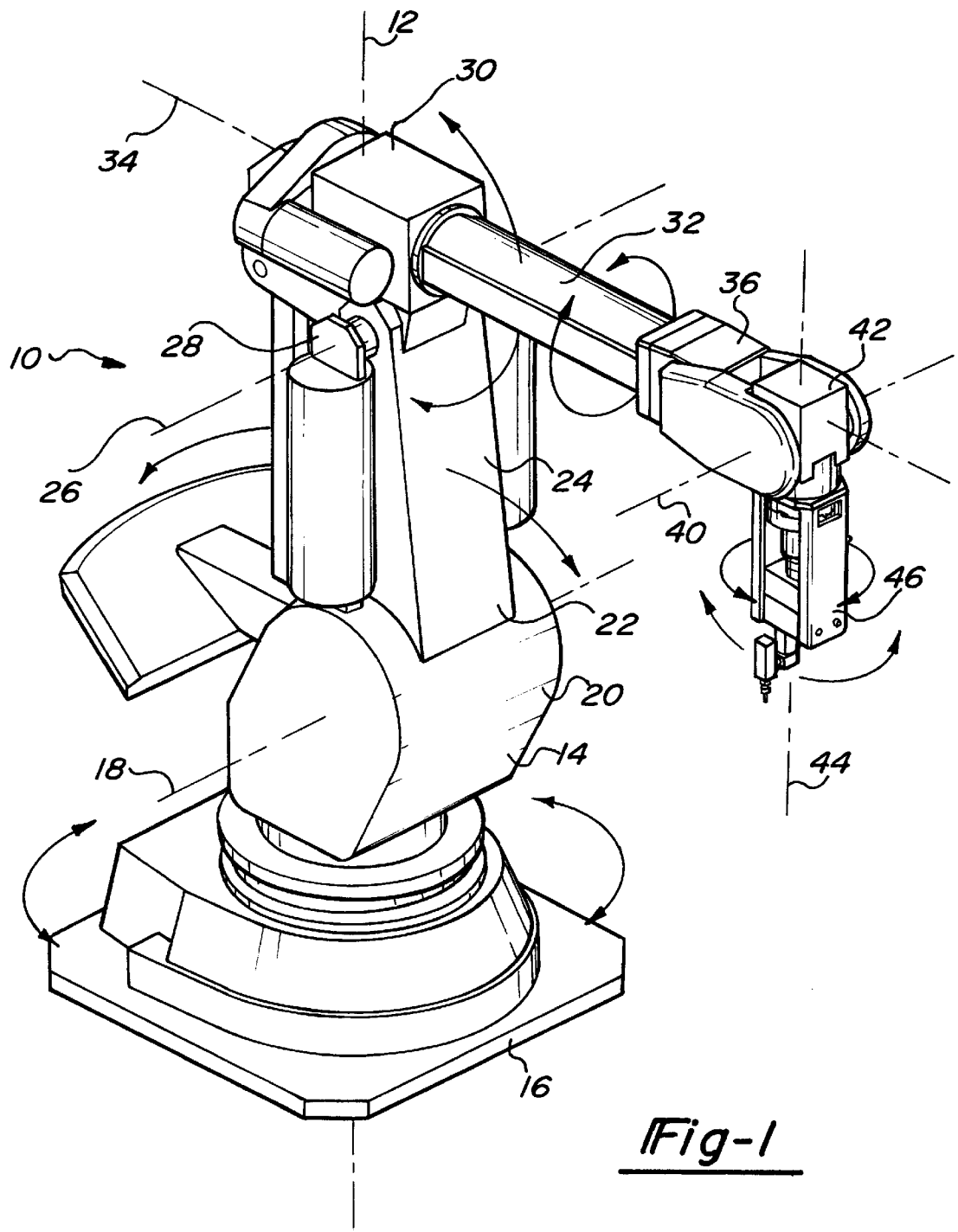
FIG. 1 illustrates a multi-axis robotic system having an integrated gear pump secured thereto as part of an end effector in accordance with the present invention.

Referring now to the drawings, a multi-axis robot is illustrated in FIG. 1 generally at 10. The multi-axis robot 10 includes six axes about which the robot 10 is positionable. These include a first rotational axis 12 extending vertically through a main body portion 14 of the robot 10 and the base 16. The first axis 12 permits rotational movement of the body 14 with respect to the base 16. A second rotational axis 18 extends laterally through a distal end 20 of the main body portion 14 and a proximal end 22 of a support member 24. The second axis 18 permits the support member 24 to pivot with respect to the body 14 about the axis of rotation 18. A third roatational axis 26 extends through a distal end 28 of the support member 24 and a proximal end 30 of an arm 32. The third axis 26 enables the arm 32 to pivot with respect to the support member 24.

A fourth rotational axis 34 extends longitudinally through the arm 32 and permits a distal end 36 of the arm 32 to rotate with respect to its proximal end 30. A fifth rotational axis 40 extends through the distal end 36 of the arm 32 and a wrist member 42. The fifth axis 40 enables the wrist 42 to pivot with respect to the arm 32. A sixth rotational axis 44 extends longitudinally through the wrist 42 and enables rotational actuation of end effector 46. As is known in the art, a motor and gear box are disposed along each axis to power the movements described above.

Figure 2:
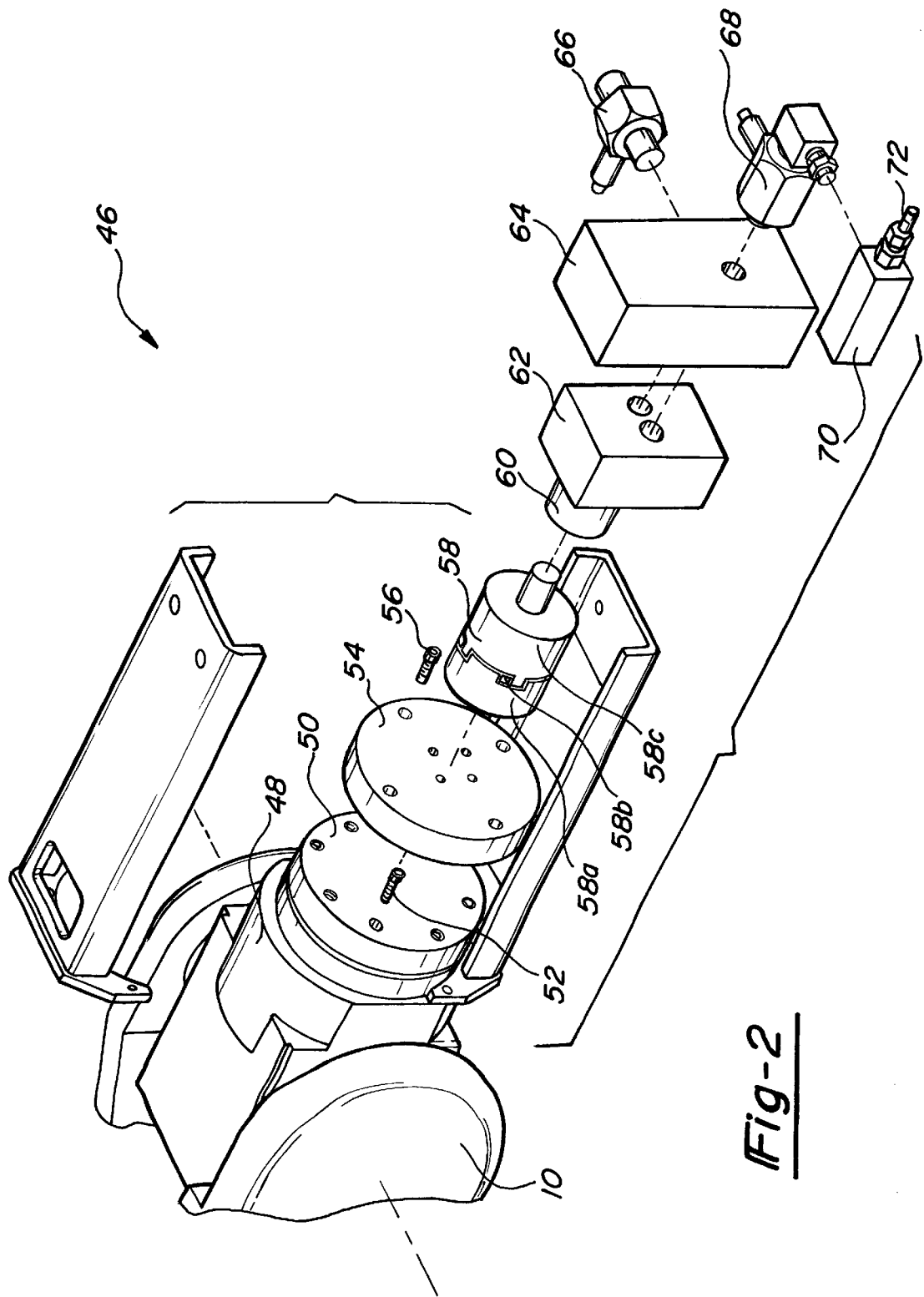
FIG. 2 is an enlarged exploded view of one embodiment of the robotic dispensing apparatus of the present invention.

Turning now to FIG. 2, a sixth axis motor 48 is disposed with its axis of rotation along the sixth axis 44. A rotatable element or face plate 50 is operably coupled to the motor 48 such that operation of the sixth axis motor 48 rotates the face plate 50. A plurality of threaded members 52 secure the face plate 50 to the motor 48. A face plate adaptor 54 is secured to the face plate 50 through a plurality of threaded members 56. The face plate adaptor 54 permits mounting of various work piece components to a common face plate 50. In this case, a flexible coupling 58 is secured to the face plate adaptor 54.

Preferably, the flexible coupling 58 includes multiple interconnecting members 58a, 58b, and 58c which allow for slight mis-alignment and increased tolerance in the system. The flexible coupling 58 also operably engages a drive shaft 60 of a gear pump 62. According to this configuration, the sixth axis motor 48 rotates the face plate 50, face plate adaptor 54 and coupling 58 to drive the gear pump 62. Gear pumps are well known in the art for pumping viscous material to a desired location. For instance, the BAS series gear pumps manufactured by Kawasaki can be used effectively in accordance with the teachings of the present invention.

A manifold 64 is disposed adjacent the gear pump 62 and is in fluid communication therewith. A manifold inlet piping system 66 interconnects the manifold 64 with a viscous material reservoir (not shown) for supplying viscous material thereto. A manifold outlet piping system 68 interconnects the manifold 64 with a dispense valve 70. A nozzle 72 disposed at the end of the dispense valve 70 emits the viscous material.

Figure 3:
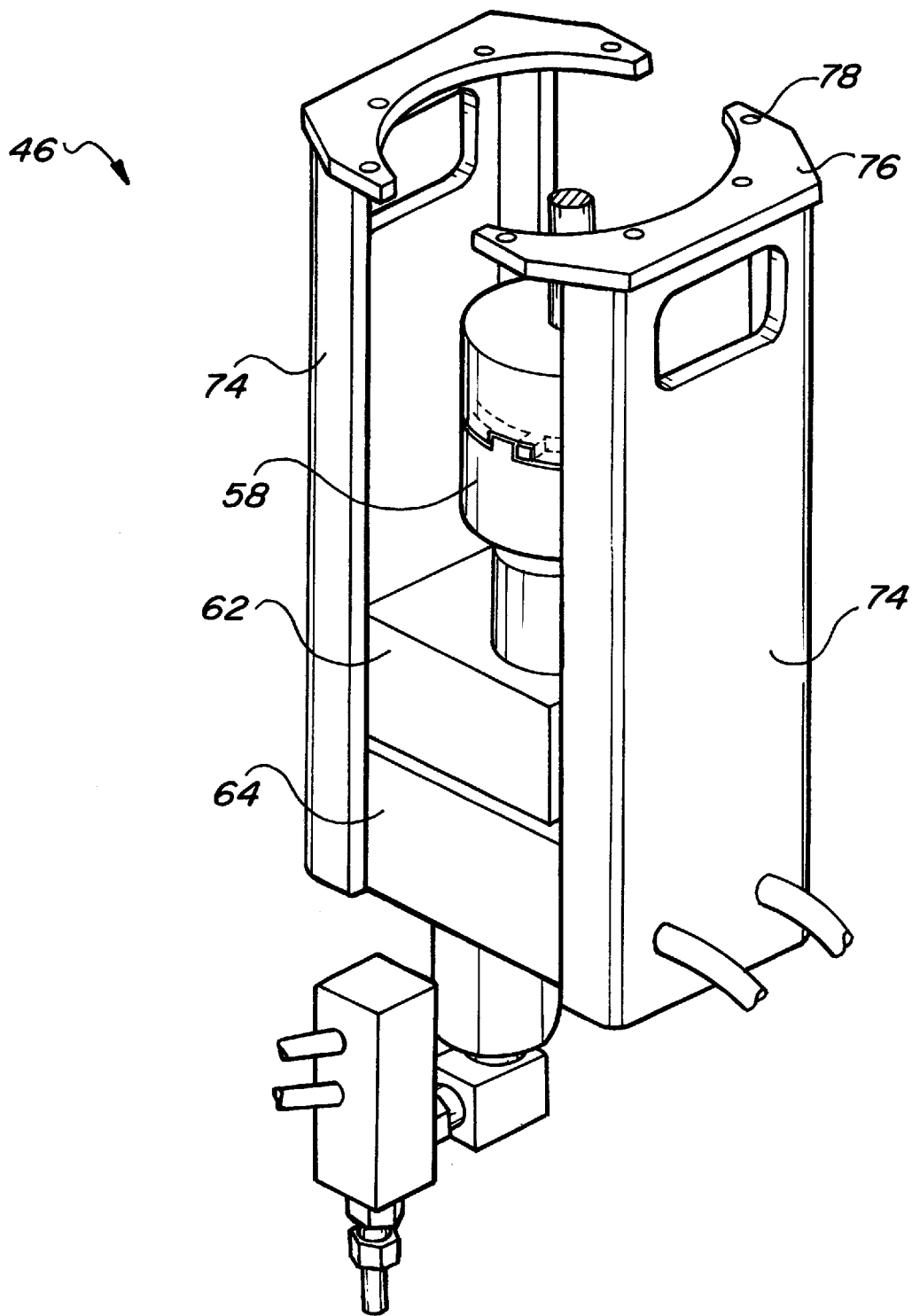
FIG. 3 depicts the robotic dispensing apparatus of the present invention in a perspective view absent the multi-axis robot.

As best seen in FIG. 3, the gear pump 62 and manifold 64 are supported by brackets 74. The brackets 74 are provided with a mounting flange 76 having a plurality of apertures 78 formed therein for permitting the brackets 74 to be secured to the fifth axis or wrist 42 by a plurality of threaded members (as shown in FIG. 1). The gear pump 62 and manifold 64 cooperate with the brackets 74 to support the coupling 58.

Referring again to FIG. 2, in operation the sixth axis motor 48 rotates the drive shaft 60 of the gear pump 62 through the face plate 50, face plate adaptor 54, and coupling 58. The gear pump 62 pumps viscous material from the viscous material reservoir through the inlet piping system 66 to the manifold 64. The viscous material is pumped from the manifold 64 through the outlet piping 68 by the gear pump 62 to the dispense valve 70. The viscous material is then emitted from the nozzle 72 to a desired location using the first through fifth axes of movement of the multi-axis robot 10 for positioning of the nozzle 72.

From the foregoing, it can be seen that compared to prior robotic dispensing systems, the integrated gear pump of the present invention alleviates the need for a separate motor and controller. Furthermore, since the gear pump is disposed adjacent the manifold, the need for a whip line extending between the gear pump and manifold is eliminated. Hence, the cost and complexity of the system is reduced and the system's responsiveness to flow rate changes is enhanced.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A robotic dispensing apparatus comprising:

a multi-axis robot having a base, said base rotatably supporting a main body portion along a first axis, said main body portion pivotally supporting a support member about a second axis, said support member pivotally supporting an arm about a third axis, said arm having a first end rotatable along a fourth axis with respect to a second end, a wrist member pivotally connected to said arm about a fifth axis, and a rotatable element rotatably mounted to said wrist along a sixth axis;

motor disposed along said sixth axis for rotating said rotatable element; and a gear pump operably coupled to said rotatable element such that said gear pump is driven by said rotatable element.

2. The robotic dispensing apparatus of claim 1 further comprising:

a dispense valve communicating with said gear pump for receiving and dispensing a preselected material.

3. The robotic dispensing apparatus of claim 1 further comprising a coupling interconnecting said rotatable element and said gear pump.

4. The robotic dispensing apparatus of claim 3 wherein said coupling is flexible.

5. The robotic dispensing apparatus of claim 1 further comprising:

at least one bracket secured to said wrist for supporting said gear pump.

6. The robotic dispensing apparatus of claim 1 further comprising:

a manifold communicating with said gear pump; and a dispense valve communicating with said manifold.

7. The robotic dispensing apparatus of claim 6 further comprising a piping system interconnecting said manifold and said dispense valve.

8. A robotic dispensing apparatus for dispensing a viscous material onto a desired location comprising:

a multi-axis robot including a base, said base rotatably supporting a main body portion along a first axis, said main body portion pivotally supporting a support member about a second axis, said support member pivotally supporting an arm about a third axis, said arm having a first end rotatable along a fourth axis with respect to a second end, a wrist member pivotally connected to said arm about a fifth axis, and a rotatable face plate rotatably mounted to said wrist along a sixth axis;

a motor operably disposed along said sixth axis and coupled to said rotatable face plate for causing rotation thereof;

a gear pump connected to said rotatable face plate;

a piping system communicating with said gear pump; and a dispense valve communicating with said piping system for dispensing said viscous material.

9. The robotic dispensing apparatus of claim 8 further comprising a coupling interconnecting said rotatable face plate and said gear pump.

10. The robotic dispensing apparatus of claim 9 wherein said coupling is flexible.

11. The robotic dispensing apparatus of claim 9 further comprising a face plate adaptor interconnecting said face plate and said coupling.

12. The robotic dispensing apparatus of claim 8 further comprising a manifold interconnecting said gear pump and said piping system.

13. The robotic dispensing apparatus of claim 8 further comprising at least one bracket supporting said gear pump.

14. The robotic dispensing apparatus of claim 13 wherein said bracket is mounted along said fifth axis of said multi-axis robot.

15. A robotic dispensing apparatus for dispensing a viscous material onto a desired location comprising:

a multi-axis robot including a base, said base rotatably supporting a main body portion along a first axis, said main body portion pivotally supporting a support member about a second axis, said support member pivotally supporting an arm about a third axis, said arm having a first end rotatable along a fourth axis with respect to a second end, a wrist member pivotally connected to said arm about a fifth axis, and a face plate rotatably mounted to said wrist along a sixth axis;

a motor disposed along said sixth axis for rotating said face plate;

a coupling coupled to said face plate;

a driving shaft of a gear pump operably engaging said coupling;

a manifold fluidly communicating with said gear pump;

inlet piping interconnecting at least one of said manifold and said gear pump with a viscous material reservoir;

outlet piping interconnecting said manifold and a dispense valve for dispensing said viscous material; and at least one bracket mounted to said wrist for supporting said gear pump.

16. The robotic dispensing apparatus of claim 15 wherein said coupling is flexible.

17. The robotic dispensing apparatus of claim 15 further comprising a face plate adaptor interconnecting said coupling and said face plate.

* * * * *